Figure 4:
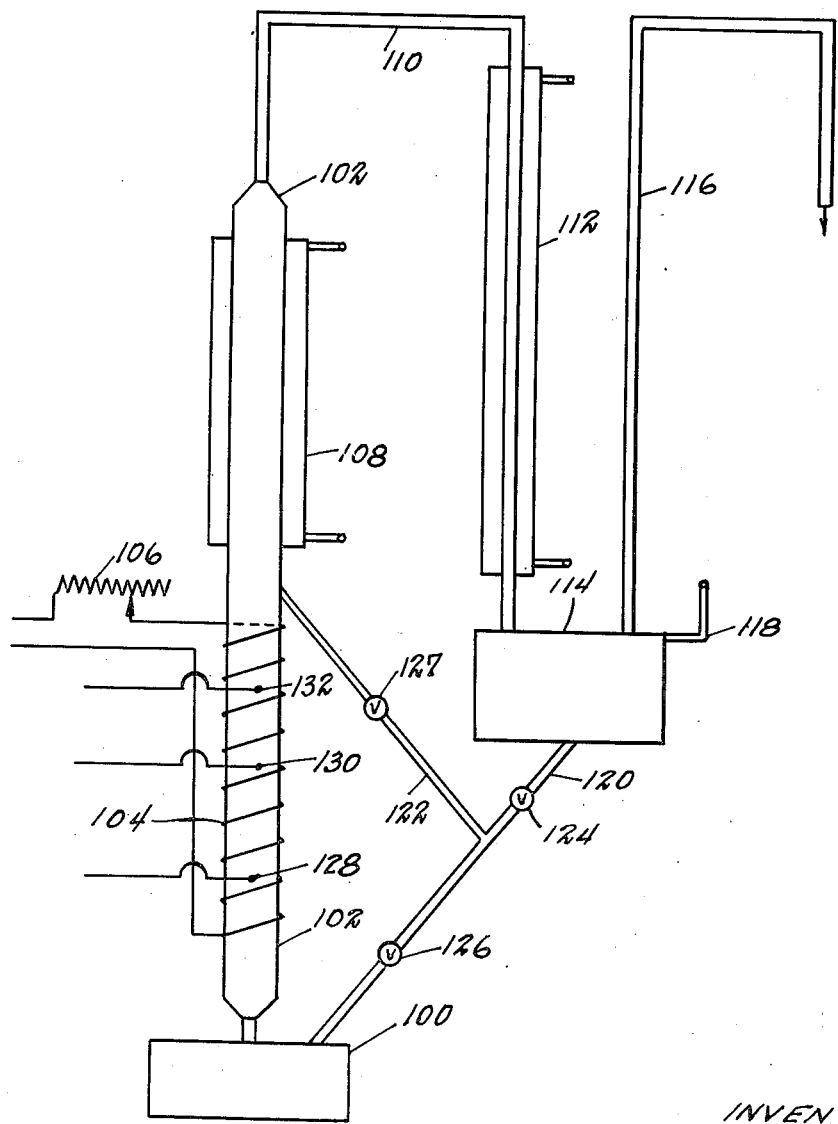

Dec. 13, 1949     H. L. GERHART     2,490,866
PREPARATION OF CYCLOPENTADIENE
FROM DICYCLOPENTADIENE
Filed Dec. 3, 1947     2 Sheets-Sheet 1
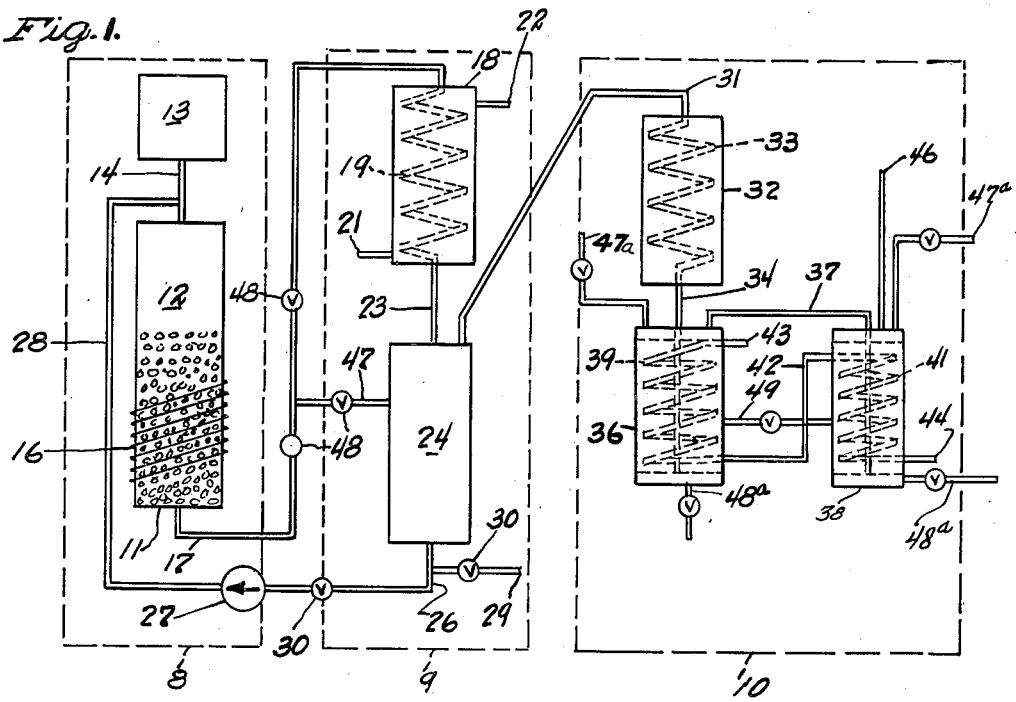
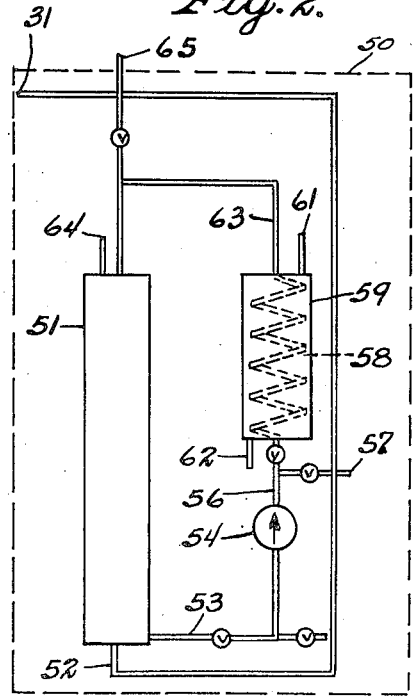
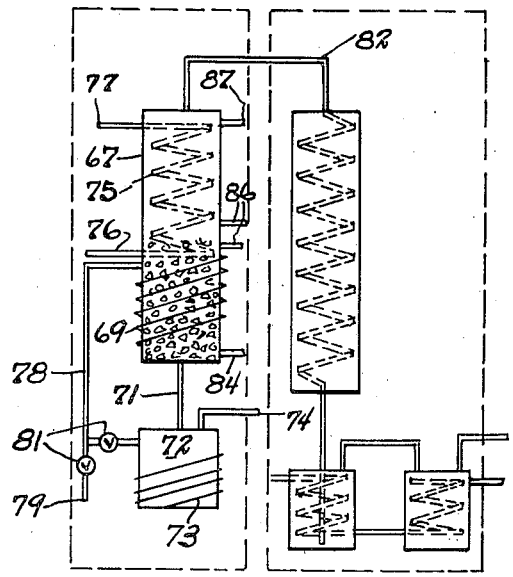
INVENTOR
HOWARD L. GERHART
BY Olen E. Bee
ATTORNEY.

Dec. 13, 1949

H. L. GERHART
PREPARATION OF CYCLOPENTADIENE
FROM DICYCLOPENTADIENE 2,490,866

Filed Dec. 3, 1947

2 Sheets-Sheet 2

INVENTOR
HOWARD L. GERHART

BY Olen E Bee
ATTORNEY.

Patented Dec. 13, 1949

2,490,866

UNITED STATES PATENT OFFICE 2,490,866

PREPARATION OF CYCLOPENTADIENE FROM DICYCLOPENTADIENE

Howard L. Gerhart, Milwaukee, Wis., assignor to Pittsburgh Plate Glass Company, Allegheny County, Pa., a corporation of Pennsylvania Application December 3, 1947, Serial No. 789,548

13 Claims. (Cl. 260—666)

The present invention relates to the preparation of diene hydrocarbons, such as cyclopentadiene from the dimer thereof, and it has particular relation to the preparation of cyclopentadiene from dicyclopentadiene by pyrogenetic decomposition.

One object of the invention is to provide a process of the foregoing type which is rapid in operation and which, when employed, results in substantially quantitative yields of cyclopentadiene.

A second object of the invention is to provide convenient and efficient apparatus for separating and recycling uncracked dicyclopentadiene and for liquefying, collecting and absorbing the cyclopentadiene.

These and other objects of the invention will be apparent from consideration of the following specification and claims.

Dicyclopentadiene is obtained in certain hydrocarbon fractions resulting as by-products of municipal gas, coal tar and petroleum industries. It has a boiling point of about 170° C. and decomposes at the latter temperature into cyclopentadiene, having a boiling point of 42° C. Accordingly, it has been proposed to prepare cyclopentadiene from the dicyclopentadiene by distilling of the latter through a fractionating column. However, this method has not been satisfactory because in the distilling process dicyclopentadiene tends not only to decompose, but also to condense or polymerize in order to form compounds which do not readily crack or split to form the monomer. The reaction is also relatively slow and inefficient and cannot be used with dilute dicyclopentadiene.

According to the present invention dicyclopentadiene is depolymerized by continuously passing dicyclopentadiene vapors which exert a pressure below atmospheric pressure, as hereinafter explained through a conduit such as a pipe which may be in the form of a pipe coil, heated above 200° C. at a zone intermediate the ends of the conduit (usually by heating the coil) and removing the cyclopentadiene evolved from the heating zone through the conduit or coil and condensing it before substantial polymerization or further cracking of the dicyclopentadiene or cyclopentadiene can occur. The temperature of heating should not be above the temperature at which serious decomposition of the cyclopentadiene occurs and usually is below about 800° C., frequently being 200 to 600° C.

This heating causes depolymerization to form cyclopentadiene. However, I have found that poor yields are obtained unless certain precautions are observed. I have discovered, according to this invention that such poor yields may be caused by further cracking of the cyclopentadiene in the heating zone and also by polymerization of the cyclopentadiene and dicyclopentadiene either in the heating zone or in cooler areas of the cracking apparatus prior to condensation. By rapidly removing the evolved cyclopentadiene from the heating zone this difficulty is avoided particularly when this rapid removal is accompanied by conduct of the resulting vapor (within several seconds or less) to a condenser capable of condensing evolved cyclopentadiene to liquid state.

This new process has been found to be highly successful for the production of cyclopentadiene in yields well above 80% and generally at least 90 to 95% of theoretical.

This process may be conducted with good effect by continuously feeding the dicyclopentadiene through a conduit such as a pipe of essentially constant diameter and heating the pipe intermediate its ends whereby rapid expansion of gases tends to occur due to the evolution of cyclopentadiene and the increase in temperature. Because free escape of the vapors from the heating zone is permitted, the expansion of the gases therein causes a rapid increase in the rate of movement of the vapor stream as it passes through the heating zone and thus affords removal of the vapor from the heating zone and delivery of the gases to a condenser (in the matter of not more than a few seconds) at a sufficiently rapid rate to inhibit polymerization of the evolved product. Obviously the same effect may be obtained if the diameter of the conduit at the exit end of the zone of heating is slightly larger or smaller than the diameter of the conduit at the inlet end of the zone, so long as free escape of the evolved vapors from the heating zone is permitted and the gas expansion in the heating zone tends to cause an appreciable increase in the rate of vapor flow through the zone.

According to the present invention, an especially effective method has been provided which ensures rapid removal of evolved cyclopentadiene from the heating zone. According to this method, dicyclopentadiene vapors which exert a pressure below atmospheric pressure are heated above 200° C. in the manner described above. Such a process is especially valuable since it prevents establishment of a large concentration of cyclopentadiene or dicyclopentadiene in the heating zone and therefore inhibits polymerization of either of these compounds. Thus the process may be performed by maintaining the cracking zone under vacuum. Furthermore the process may be conducted in the presence of diluents for example vapors of other liquids which boil at the temperature range of the boiling point of dicyclopentadiene and which establish a vapor mixture in which the dicyclopentadiene is present and in which the partial pressure of the dicyclopentadiene is below atmospheric.

For a better understanding of the invention reference may now be had to the accompanying drawings in which the Figures 1, 2 and 3 are diagrammatic views illustrating respectively an assembly of apparatus for use in practicing the invention; a modified form of absorbing apparatus for taking up cyclopentadiene as it is formed; a form of the apparatus including a slightly modified type of converter for pyrogenetically changing dicyclopentadiene into cyclopentadiene and Fig. 4 is a diagrammatic view of a further assemblage which may be used in the performance of this invention.

In the drawings like numerals refer to like parts throughout.

The apparatus as shown in Figure 1 includes three sections 8, 9, and 10, enclosed for purposes of clarity, by dotted lines. Section 8 includes apparatus for pyrogenetic treatment of dicyclopentadiene, e. g. a suitable tower 11, the bottom portion of which may be packed with a porous or granular material 12 such as fragments or rings of carbon, or steel chips or shavings, fragments or rings of porcelain or any other material which will provide a suitable non-reactive foraminous packing. Dicyclopentadiene is supplied to the tower at a regulated rate of flow from a reservoir 13, which is connected to the tower by a line 14. Heat is supplied to the treating column or chamber by any suitable means, e. g., by means of electrical resistance element 16, appropriately coiled about the exterior of the chamber.

The vaporous products from the chamber of column 11 are discharged at the bottom of the latter through a line 17, to apparatus 9 that includes appropriate means for effecting separation of cyclopentadiene from any unconverted dicyclopentadiene. The latter apparatus as shown in Figure 1 includes a condenser of conventional design involving a shell or column 18 through which extends a condenser coil 19 joined at its upper end to line 17. Cooling fluid is admitted to the shell through a line 21 and discharges through line 22. Condensed products are discharged from the lower extremity of the coil 19 by means of a line 23 into a still 24, the temperature of which is appropriately controlled by conventional means (not shown) such as a coil for heating or cooling fluid. In the still, cyclopentadiene is vaporized, while any dicyclopentadiene is retained in liquid phase and is discharged from the bottom of the still through a line 26 leading to a pump 27, that recycles it through line 28 to the feed line 14. If preferred, dicyclopentadiene may be discharged to an appropriate receiver through a line 29. Valves 30 in lines 26 and 29 provide means for controlling the discharge of recovered dicyclopentadiene.

Cyclopentadiene, in vapor form, is discharged from the still through line 31 extending to receiver apparatus 10. The apparatus shown in Fig. 1 includes a condenser column 32 through which extends a coil 33 connected at its upper extremity to the line 31. At the lower extremity, the coil is connected to a line 34 extending downwardly and discharging adjacent to the bottom of a receiver 36 is filled to an appropriate level with an absorption liquid. Vapors of cyclopentadiene bubble upwardly through the liquid and those not absorbed in receiver 36 are discharged at the top thereof through a conduit 37 that extends downwardly almost to the bottom of a second receiver 38, which likewise is appropriately filled with absorption liquid. Liquid within the receivers 36 and 38 may be cooled to optimum temperature for absorbing cyclopentadiene by means of cooling coils 39 and 41 connected in series by conduit 42 and being respectively provided with inlet 43 and outlet 44. The absorption chamber 38 is also provided at its upper extremity with a line 46 leading to a suitable source of vacuum (not shown) by means of which the entire system is maintained under an appropriate degree of vacuum.

If preferred, the vapors from the converter 11 need not be condensed in condenser 18. Instead the condenser may be by-passed by means of line 47 directly connecting the line 17 with an appropriate portion of the still 24. The latter may then be operated as a flash tower in which the relatively high boiling dicyclopentadiene is condensed while the relatively volatile cyclopentadiene passes off as a vapor through line 31 to absorber 10. Of course lines 17 and 47 are provided with suitable valves 48 by means of which the path of the vapors can be controlled or determined at will.

Fresh absorption liquid or solvent may be admitted to either receptacle 36 or 38 through inlets 47a and charged absorbent liquid may be drawn off by vacuum through outlets 48a. The two containers are also interconnected by line 49 for countercurrent or concurrent flow of the solvent.

In Figure 2 is shown a modified form of absorber for cyclopentadiene which is indicated in general by the numeral 50. The unit may be substituted bodily for the unit 10 disclosed in Figure 1. It includes a tower or absorption column 51 into the bottom of which a line 52 connected to line 31, from still 24 discharges cyclopentadiene vapors. For purposes of cooling the absorption medium the absorption column is also provided with a discharging conduit or line 53 leading to a pump 54, which discharges through line 56 or optionally to an outlet line 57, leading to a suitable storage receiver or to a cooling coil 58, in a cooling column 59 provided with inlet and outlet conduits 61 and 62, through which a suitable cooling medium may be circulated. The coil 58 is connected to discharge cooled fluid through conduit 63 into the upper extremity of the absorption column 51. The system is maintained under vacuum by means of conduit 64 leading to a suitable vacuum pump (not shown). Fresh solvent is added through line 65.

A second form of pyrogenetic treating unit which may be substituted for the unit 8 is shown in Figure 3, and includes a column 67, the bottom portion of which is appropriately packed with carbon rings or lumps or steel chips or shavings, or any other suitable packing material. The zone of the column containing the packing is heated by means of a resistance coil 69. Vapors of dicyclopentadiene are discharge upwardly through the packing material through a line 71 from a still 72, which is heated by resistance element 73 or the like, and is provided with an inlet conduit 74 leading to a suitable source of supply of dicyclopentadiene. The upper portion of the column is provided with a condenser coil 75 having inlet 76 leading to a suitable source of cooling fluid such as water, and an outlet 77 leading to some convenient means for disposing of the warm fluid.

Undecomposed dicyclopentadiene passing upwardly through the packing in the column is condensed by the coil and is collected and recycled to the still 72 by a conduit 78 connected to an intermediate portion of the column. If preferred the condensed dicyclopentadiene may be discharged to storage by conduit 79, which is connected to line 78. Valves 81 in the lines 78 and 79 provide means for determining the course of flow of the condensed liquid.

The vapors consisting essentially of cyclopentadiene are discharged from the top of the column through line 82 leading to an absorption system which, as shown in the drawings, substantially corresponds to the system 10 shown in Figure 1. Of course it will be apparent that the absorption apparatus 50 disclosed in Figure 2 may be substituted in lieu thereof.

The point of inlet of the dicyclopentadiene into the system is optional. For example, it is quite possible to charge it through a line 84 to the bottom of the column 67, or if preferred, it may be charged to intermediate portions of the column through lines 86, or to the top portion through line 87. The dicyclopentadiene will then be vaporized in the column, or in event that it is not at once vaporized, it will return backwardly through line 71 or line 78 to the still 72 where it will be vaporized and permitted to pass upwardly through the packing in the column 67.

In the operation of the apparatus disclosed in Figure 1, dicyclopentadiene from the container 13 is fed downwardly through conduit 14 into the cracking column 12 which is suitable packed with carbon rings or steel filings or the like. The lower portion of the column which constitutes the cracking zone is maintained at a temperature above about 170° C. and preferably within a range of about 200°–3000 C. The latter temperature may sometimes be exceeded and may even be as high as 800° C., but in general it is preferable not to do so. In any event the temperature should not be so great as to cause excessive charring of the charge, or to cause vapors to be discharged from the still at such temperature and rate as to carry over an excessive amount of uncracked or unchanged dicyclopentadiene. The system is evacuated through the conduit 46, and preferably the pressure (absolute) within the system is at least 50 millimeters below the pressure of the surrounding atmosphere usually within the range of about 25 to 600 mm. of mercury, a good average operating pressure being approximately ½ atmosphere.

Vapors of cyclopentadiene admixed with some dicyclopentadiene pass from the cracking zone through conduit 17 into condenser coil 19, where the latter vapors, along with some of the former, are condensed and run down into the still 24. In the still, the cyclopentadiene is maintained in or converted into vapor phase and passes off through line 31. The latter, if desired, may be of such length or may be provided with cooling means in order to impart thereto a certain degree of refluxing action to assist in the thorough separation of any dicyclopentadiene carried in the vapors. Dicyclopentadiene is withdrawn from the bottom of the still through line 26 and is returned by pump 27 to feed line 14.

If preferred the dicyclopentadiene may also be withdrawn to storage through line 29.

Cyclopentadiene vapor passing off through conduit 31 is conducted to absorption apparatus 10 shown in Figure 1, or to apparatus 50, shown in Figure 2. Assuming it is conducted to the former, the vapor passes downwardly through condenser coil 33, maintained at an appropriate temperature. The coil then discharges into receiver 36 filled with an absorbent medium such as xylol, tung oil, soya bean oil, linseed oil or other vegetable oil. Any vapors not absorbed pass over through line 37 into absorber 38. Assuming that the system is at a pressure of about ½ atmosphere and that the absorption liquid such as xylol or the like within the receivers 36 and 38 is at a temperature of zero degrees C., a concentration of 50% cyclopentadiene in xylol can readily be obtained.

Where oils are employed as absorbents, the mixture may be subjected to polymerization by heating to 50° C. or thereabout in the presence of 2 or 3% of a catalyst, such as fluoboric acid. The product is probably a joint polymer of the hydrocarbon and the oil. Details of polymerization of cyclopentadiene in a glyceride oil are disclosed in my copending application entitled Resinous material, Serial No. 324,392, filed March 16, 1940, now United States Letters Patent No. 2,398,889, granted April 23, 1946.

The absorbers 36 and 38 may be filled through lines 47a and then operated until the liquid is sufficiently saturated, after which the liquid is drawn off for separation of the cyclopentadiene by distillation. It is also possible to make additions of solvent continuously or in small amounts at short intervals and to make corresponding withdrawals of charged solvent at outlets 48a. If preferred, counter-current flow may be obtained by charging fresh solvent into receptacle 36, transfer of solvent from one receptacle to the other being effected through line 49. Likewise, the flow may be reversed or made concurrent by making additions of fresh solvent to receptacle 36 and withdrawals from receptacle 38.

As already stated, condenser 19 may be eliminated and the still 24 operated as a flash tower. In the latter event the valves 48 are operated to effect the passage of the vapor products from column 11 through conduit 47 directly to the still. The still is then maintained at such temperature that the cyclopentadiene passes off through line 31, while the unchanged dicyclopentadiene is condensed and again recycled through line 26 and pump 27 to the cracking column 11.

Regardless of whether the column 24 is operated as a still to effect distillation of cyclopentadiene from dicyclopentadiene condensed in coil 19, or as a flash tower directly receiving the products from the column 11, it will be apparent that recovery of the cyclopentadiene, by absorption in xylol or other solvent, may be effected in either the apparatus 10, as shown in Figure 1, or in the apparatus 50, as shown in Figure 2.

In event that the apparatus shown in Figure 2 is employed for absorption of cyclopentadiene, the vapors are discharged through line 31 to line 52, which then feeds them into the bottom of tower 51. Xylol or the like absorbent in the tower flows out through line 53 and is forced upwardly by pump 54 through line 56 to cooler coil 58. It returns through line 63 to the top of tower 51 and is thus maintained in counter-current flow in the latter. Additions of fresh absorbent are made through line 65 and corresponding withdrawals are made through line 57.

In the operation of the cracking apparatus disclosed in Figure 3 dicyclopentadiene may be charged into the still 72 where it is boiled at a subatmospheric pressure for example, a pressure of about ½ atmosphere and the vapors pass upwardly into the cracking column 67, where they are subjected to a cracking temperature, for example, about 200–300° C. The vapors of cyclopentadiene and uncracked dicyclopentadiene and any impurities contained therein pass into the upper part of the column where they are cooled by the coil 75 to such degree as to condense the dicyclopentadiene and the impurities. The monomer passes on through the conduit 82 to the absorption apparatus. The dicyclopentadiene and the impurities are returned to the cracking zone or else are carried by the conduit 78 back to the still 72. Direct return of the unchanged material may be assisted by causing the pressure to surge over a range of about 50 mm. at 30 second intervals.

If preferred, dicyclopentadiene may be charged directly into the column 67. Admission may be effected at any one of the points 84, 86 or 87. If the material is introduced at the former point it is converted into vapors which pass upwardly through the packing within the column. If it is introduced at the top of the column the cold liquid helps to reduce or control the temperature of the reaction zone. Cyclopentadiene vapors when properly separated from dicyclopentadiene vapors can be drawn off at the top of the still or column 67 through column 82, or if preferred from the line 78 and line 79. Recovery of the cyclopentadiene may be effected by conducting the vapors through absorbing units 10 or 50.

The apparatus is capable of effecting substantially 100% conversion of dicyclopentadiene into cyclopentadiene. The process is substantially continuous and the rate of charging may be relatively high and is limited only by the size of the cracking zone and the capacity of the apparatus employed to separate cyclopentadiene from unchanged dicyclopentadiene.

In order to demonstate efficiency and high capacity of the apparatus for converting the dimer of cyclopentadiene into the monomers, 204 parts of an 80% solution of dicyclopentadiene were charged into a round bottomed glass flask equipped with a lagged fractionating column. The flask was heated to boiling and the cyclopentadiene as it evolved was condensed in a receiver chilled by dry ice. In three hours 144 parts of cyclopentadiene were collected. Any attempt to hasten the cracking operation by applying more heat to the still resulted in the dicyclopentadiene distilling over.

For purposes of comparison, an apparatus of the design shown in Figure 1 was fed by continuous flow over a period of 4 hours with 1678 grams of dicyclopentadiene solution similar to that above described. The pressure in the cracking column 11 was maintained at 380 mm. and the temperature of the cracking zone was maintained at 300° C. at the top and 325° C. at the bottom. The condensor 18 was maintained at a temperature of 72° C. and the absorption chambers 36 and 38 were maintained at zero degrees C. Absorption was continued until the concentration of cyclopentadiene in the xylol employed as an absorption medium was 60%. In this way a total of 1,112 grams of cyclopentadiene was absorbed. The liquid from the still 24 was recycled to obtain a 5% additional yield of cyclopentadiene. Dicyclopentadiene may be replaced by dicyclohexadiene to produce hexadiene.

To perform a further series of experiments, an apparatus illustrated in Fig. 4 was erected. This apparatus comprised a still 100 connected to the lower end of a vertically mounted tube 102, 6 feet in length and two inches in diameter. The lower half of this tube was wrapped with a heating coil 104 which was provided with a rheostat 106 and was connected to a source of potential (not shown). Means for measuring the temperature within the heating zone was provided by disposing three thermocouples 128, 130 and 132 in the bottom, middle and top respectively of the heating zone.

The upper portion of the tube was provided with a cooling jacket 108 which effected a precooling and condensation of dicyclopentadiene from the cyclopentadiene. The tube 102 was provided with an outlet line 110 to convey evolved vapors rapidly to condenser 112 which was connected at its lower end to a receptacle 114. The tube 102 also was provided with a conventional collector (not shown) for collecting any condensate (dicyclopentadiene) which flows down the walls of the tube from the jacketed portion thereof and for delivering such collected condensate to the still 100 by way of lines 122 and 120. Receptacle 114 was connected to still 100 by line 120 and the lines 122 and 120 were provided with suitable valves 124, 126 and 127 for regulating flow therethru.

Receptacle 114 was provided with an outlet 116 which was connected to a cyclopentadiene condenser and also to a vacuum pump. This receptacle also had an inlet 118 for introduction of dicyclopentadiene into the system.

In the operation of this equipment dicyclopentadiene was introduced through inlet 118 and allowed to flow into the still. Valve 126 was closed and the still was heated to vaporize dicyclopentadiene. The vapors passed upwardly through the heating zone, were partially cooled in the upper jacketed portion of the tube and further cooled in condenser 112 to condense out dicyclopentadiene and certain high boiling impurities if present and to deliver this material to the receptacle 114. Cyclopentadiene vapor passed on through line 116 and immediately to a water cooled condenser where the cyclopentadiene was condensed. Thus the evolved cyclopentadiene was condensed within a very short time (not more than 5 to 10 seconds) after leaving the heating zone.

The following are the conditions of operation of a single run using technical grade dicyclopentadiene which contains about 80% by weight of dicyclopentadiene and other components boiling in the range of dicyclopentadiene such as cumarone, indene, styrene, diisoprene, dipiperylene, alkyl dicyclopentadiene, etc. In this case the other impurities were separated from the evolved cyclopentadiene by condensation in condenser 112 and collected in receptacle 114.

Temperature of heating zone:
    Bottom _____°C__ 345
    Top _____°C__ 250
Absolute pressure ____millimeters
                      of mercury__ 230–240
Charge of technical dicyclopentadiene
                                    grams__ 500
Yield of cyclopentadiene _____do____ 390
Percent of theoretical yield _____per cent__ 97.5

In a further test using pure dicyclopentadiene and similar apparatus to that shown in Fig. 4, 30 cc. of Russian mineral oil were introduced into the still and other conditions of operation were as follows:

Pressure in column _____millimeters__ 213
Pressure of vacuum pump _____do____ 155
Temperature of heating zone
   Bottom _____°C__ 350
   Middle _____°C__ 470
   Top _____°C__ 295
Input of dicyclopentadiene _____grams__ 214
Output of cyclopentadiene _____do____ 203.3

Recourse to subatmospheric pressure as above described permits the contemplated depolymerization to occur in high yield and without production of excessive amounts of undesirable by-products. These advantages appear to be attained for a number of reasons. First, the use of a subatmospheric pressure permits vaporization of dicyclopentadiene at temperatures below its normal boiling point and tendency for polymer formation is minimized. Further, molecules of dicyclopentadiene and cyclopentadiene are dispersed so that likelihood of contact therebetween in the cracking zone or before condensation is reduced thus reducing possibility of polymer formation. Moreover use of subatmospheric pressure facilitates rapid removal of the vapors to the condensing system.

Any convenient method of cracking dicyclopentadiene vapor which exerts a pressure below atmospheric is within the contemplation of this invention. While such a vapor pressure may be effectively established by imposing a subatmospheric pressure upon the system other methods may be resorted to in order to achieve the objects herein contemplated.

Thus, as shown above the cyclic diene hydrocarbon may be diluted with substantial, for example, equal volumes of petroleum hydrocarbon or other diluent, boiling below about 170° C. (the boiling point of dicyclopentadiene) particularly those boiling within a range of 160 to 180° C. It will be apparent that the use of such inert or nonreactive diluents results in distillation of a mixture of the diluent and the dicyclopentadiene, which mixture enters the cracking zone. It will be equally apparent that even when the dicyclopentadiene-inert diluent vapor mixture exists at atmospheric pressure, the partial pressure of the dicyclopentadiene will be less than atmospheric pressure. Consequently use of an inert diluent which distills with the dicyclopentadiene permits recourse to higher pressures and it has been found that the process may be conducted with good yield at atmospheric pressure in such a case.

Various diluents are permissible so long as they distill with the dicyclopentadiene and thereby permit establishment of a dicyclopentadiene partial pressure below atmospheric pressure. Quite commonly technical grade dicyclopentadiene contains other hydrocarbons which have boiling points approximating that of dicyclopentadiene. This is particularly true of dicyclopentadiene which has been prepared by cracking of natural gas or of petroleum oil refining gases. Such products contain dicyclopentadiene mixed with homologues and alkyl substitution products thereof, coumarone, indene, etc., and may also contain some benzene and/or toluene. Such technical mixtures may be treated as herein described without use of further diluents. Moreover, other diluents such as various hydrocarbons (whether miscible or immiscible) which distill with dicyclopentadiene and therefore cause establishment of a dicyclopentadiene partial pressure below that of the atmosphere (preferably at least 50 millimeters below) may be used. Nonreactive gases such as carbon dioxide, natural gas or nitrogen also may be used.

High boiling diluents, such as those boiling in the range of the dicyclopentadiene boiling point and frequently found in technical grade dicyclopentadiene or others boiling above cyclopentadiene are separated by fractional condensation from evolved cyclopentadiene in a condenser such as diagrammatically illustrated in Fig. 4 (condenser 112) of the drawings. Consequently, the condensed cyclopentadiene may be obtained in a highly pure state (above 95%) and essentially free from impurities present in technical grade dicyclopentadiene.

Although the present invention has been described with reference to specific details of certain embodiments it is not intended that such details shall be regarded as limitations upon the scope of the invention except insofar as included in the accompanying claims. This application is a continuation in part of my copending application Serial No. 324,391, filed March 16, 1940, now abandoned.

I claim:

1. A process as defined in claim 3 in which the cyclopentadiene is absorbed in a hydrocarbon solvent.

2. A process as defined in claim 3 in which the cyclopentadiene is absorbed in a vegetable oil.

3. A process of preparing cyclopentadiene from dicyclopentadiene which comprises continuously passing dicyclopentadiene into a cracking zone at a temperature of about 170 to 300° C. and under a pressure of about 25 to 500 mm. of mercury, to obtain a vaporous mixture of cyclopentadiene and dicyclopentadiene, continuously withdrawing the vaporous mixture from the cracking zone, condensing out the dicyclopentadiene and absorbing the cyclopentadiene in a solvent medium.

4. A process of preparing cyclopentadiene from dicyclopentadiene, which comprises continuously passing vapors of dicyclopentadiene into a cracking zone at a temperature of about 170 to 300° C. and at a pressure within the range of about 25 to 500 mm. of mercury to crack the dicyclopentadiene and form a vaporous mixture of cyclopentadiene and dicyclopentadiene, removing a corresponding amount of vaporous mixture from the cracking zone, subsequently condensing out the dicyclopentadiene and recycling it and absorbing the cyclopentadiene in a solvent medium.

5. A process of preparing cyclopentadiene from dicyclopentadiene, which comprises continuously passing dicyclopentadiene in vapor phase into a cracking zone at a pressure not above 500 mm. and at a temperature of 200 to 300° C., removing the resultant mixture of cyclopentadiene and dicyclopentadiene vapors from the cracking zone by causing them to pass upward, condensing out the dicyclopentadiene and returning it to the cracking zone, the return of the condensed dicyclopentadiene being assisted by causing the pressure in the cracking zone to fluctuate.

6. A process of preparing cyclopentadiene from dicyclopentadiene, which comprises continuously passing vapors of dicyclopentadiene into a cracking zone at a temperature of about 170 to 300° C. and at a pressure within a range of about 25 to 500 mm. to crack the dicyclopentadiene and form a vaporous mixture of cyclopentadiene and dicyclopentadiene, removing a corresponding amount of vaporous mixture from a cracking zone, condensing out the dicyclopentadiene from the mixture and recycling it and absorbing the cyclopentadiene in the drying glyceride oil to provide a mixture suitable for copolymerization into a resinous body.

7. Process for producing cyclopentadiene from dicyclopentadiene which comprises continuously passing a stream of superheated vapors of dicyclopentadiene under subatmospheric pressure through a depolymerization zone maintained at a temperature within the range between 200° C. and 300° C., and removing from such zone the resultant cyclopentadiene sufficiently rapidly that substantial further polymerization of the dicyclopentadiene is inhibited.

8. A process of producing cyclopentadiene from dicyclopentadiene which comprises continuously passing a stream of superheated vapors of dicyclopentadiene under subatmospheric pressure through a depolymerization zone maintained at a temperature above 200° C. and below the temperature at which substantial decomposition of the cyclopentadiene occurs and removing from such zone the resultant cyclopentadiene sufficiently rapidly that substantial further polymerization of the dicyclopentadiene is inhibited.

9. A process of producing cyclopentadiene from dicyclopentadiene which comprises vaporizing dicyclopentadiene at a temperature below the boiling point at normal atmospheric pressure, continuously passing the dicyclopentadiene thus formed through a depolymerization zone maintained under subatmospheric pressure at a temperature of at least 200° C. and below the temperature at which substantial decomposition of the cyclopentadiene occurs and removing from such zone the resultant cyclopentadiene sufficiently rapidly that substantial further polymerization of the dicyclopentadiene is inhibited.

10. A process of producing cyclopentadiene which comprises forming vapors of dicyclopentadiene by heating dicyclopentadiene in a zone of vaporization under subatmospheric pressure substantially to the boiling point of dicyclopentadiene at said pressure, continuously passing the vapors through a depolymerization zone maintained under subatmospheric pressure and at a temperature above about 200° C. and below that of decomposition of cyclopentadiene and removing the resultant cyclopentadiene sufficiently rapidly that substantial further polymerization of the dicyclopentadiene is inhibited.

11. A process for producing cyclopentadiene from dicyclopentadiene which comprises forming vapors of dicyclopentadiene by heating dicyclopentadiene in a zone under subatmospheric pressure substantially to the boiling point of dicyclopentadiene at said pressure, continuously passing the vapors of dicyclopentadiene thus formed which vapors exert a subatmospheric pressure through a zone of depolymerization maintained at a temperature above 200° C. and below the temperature at which decomposition of cyclopentadiene occurs and removing the resultant cyclopentadiene sufficiently rapidly that substantial further polymerization of the dicyclopentadiene is inhibited.

12. A process of producing cyclopentadiene from dicyclopentadiene which comprises continuously passing a stream of vapors of dicyclopentadiene, which vapors exert a subatmospheric pressure, through a depolymerization zone maintained at a temperature above 200° C. and below the temperature at which substantial decomposition of the cyclopentadiene occurs and removing from such zone the resultant cyclopentadiene sufficiently rapidly that further polymerization of the dicyclopentadiene is inhibited.

13. A method of preparing cyclopentadiene which comprises continuously passing a stream of vapors of dicyclopentadiene and impurities boiling in the same range with cyclopentadiene, which vapors of dicyclopentadiene exert a subatmospheric pressure, through a conduit, heating the conduit at a zone intermediate the ends thereof above 200° C. and below 800° C. whereby dicyclopentadiene is cracked and a substantial volume increase of the vapors occurs and causes an increase in the rate of vapor flow through the conduit, and permitting free escape of such vapors through the conduit at the increased rate of flow to a zone of lower temperature, whereby cyclopentadiene formed is removed from the heating zone and condensed before substantial polymerization of the cyclopentadiene can occur.

HOWARD L. GERHART.

REFERENCES CITED

The following references are of record in the file of this patent:

UNITED STATES PATENTS

| Number | Name | Date |
| --- | --- | --- |
| 2,196,363 | Robertson | Apr. 9, 1940 |
| 2,211,038 | Ward | Aug. 13, 1940 |

OTHER REFERENCES

Harkness et al., Jour. Chem. Physics, vol. 5, 684–7 (1937).

Schulze, Oel Kohle Erdoel Teer, vol. 14, 113–117 (1938).